United States Patent [19]

Akiyama

[11] Patent Number: 5,798,764
[45] Date of Patent: Aug. 25, 1998

[54] METHOD FOR DETERMINING THE INTERSECTIONS OF DELAUNAY PARTITIONED TETRAHEDRA WITH THE BOUNDARY OF A BODY TO BE ANALYZED

[75] Inventor: Yutaka Akiyama, Tokyo, Japan

[73] Assignee: NEC Corporation, Tokyo, Japan

[21] Appl. No.: 949,949

[22] Filed: Oct. 14, 1997

Related U.S. Application Data

[63] Continuation of Ser. No. 453,711, May 30, 1995, abandoned.

[30] Foreign Application Priority Data

May 27, 1994 [JP] Japan .................................. 6-115268

[51] Int. Cl.$^6$ .............................................. G06T 17/20
[52] U.S. Cl. .................................. 345/423; 345/434
[58] Field of Search .................. 395/119, 123, 395/134; 345/419, 423, 434

[56] References Cited

U.S. PATENT DOCUMENTS

| 5,125,038 | 6/1992 | Meshkat et al. | 382/22 |
| 5,214,752 | 5/1993 | Meshkat et al. | 395/123 |

FOREIGN PATENT DOCUMENTS 3-214266  9/1991  Japan .

OTHER PUBLICATIONS

Ryo Dan, "Process Device Simulatio Techniques", pp. 91–123, published 1988 by Sangyo Tosho.

Rafferty et al., "Iterative Methods In Semiconductor Device Simulation", ieee Transactions on Electron Devices, vol. ED–32, No. 10, pp. 2018–2027, (1985).

M.S. Mock, "Tetrahedral Elements And The Scharfetter–Gummel Method", Proceeding of the NASECODE IV, pp. 36–47, (1985).

D.F. Watson, "Computing the n–dimensional Delaunay Tessellation With Application to Voronoi Polytopes", The Computer Journal, vol. 24, No. 2, pp. 167–172, (1981).

Primary Examiner—Mark K. Zimmerman
Attorney, Agent, or Firm—Foley & Lardner

[57] ABSTRACT

A method is described for determining an intersection of a boundary of a body with each of Delaunay partitioned tetrahedra, the body exhibiting edges and faces. Firstly, a plurality of first tetrahedra are produced by dividing the body into a plurality of triangular prisms and then dividing each triangular prism into a plurality of tetrahedra, which is a face segment of said body, is found. Further, any edge of each first tetrahedron, which is an edge segment of said body is found. Subsequently, a plurality of second tetrahedra are generated each of which is Delaunay partitioned. Thereafter, the following steps are cyclically implemented to investigate in sequence all of the second tetrahedra. A unique point within the second tetrahedron is determined and then, a third tetrahedron which includes the unique point therewithin is determined among the first tetrahedra. A check is made to determine if any edge of the third tetrahedron, which is an edge segment of the body, intersects any face of the second tetrahedron, and to determine if any face of the third tetrahedron, which is a face segment of the body, intersects any edge of the second tetrahedron. Intersection information is obtained if the aforesaid intersection is specified or determined.

13 Claims, 16 Drawing Sheets

NEW MESH POINT(E)

NEW MESH POINT(E)

F

NEW MESH POINT(E)

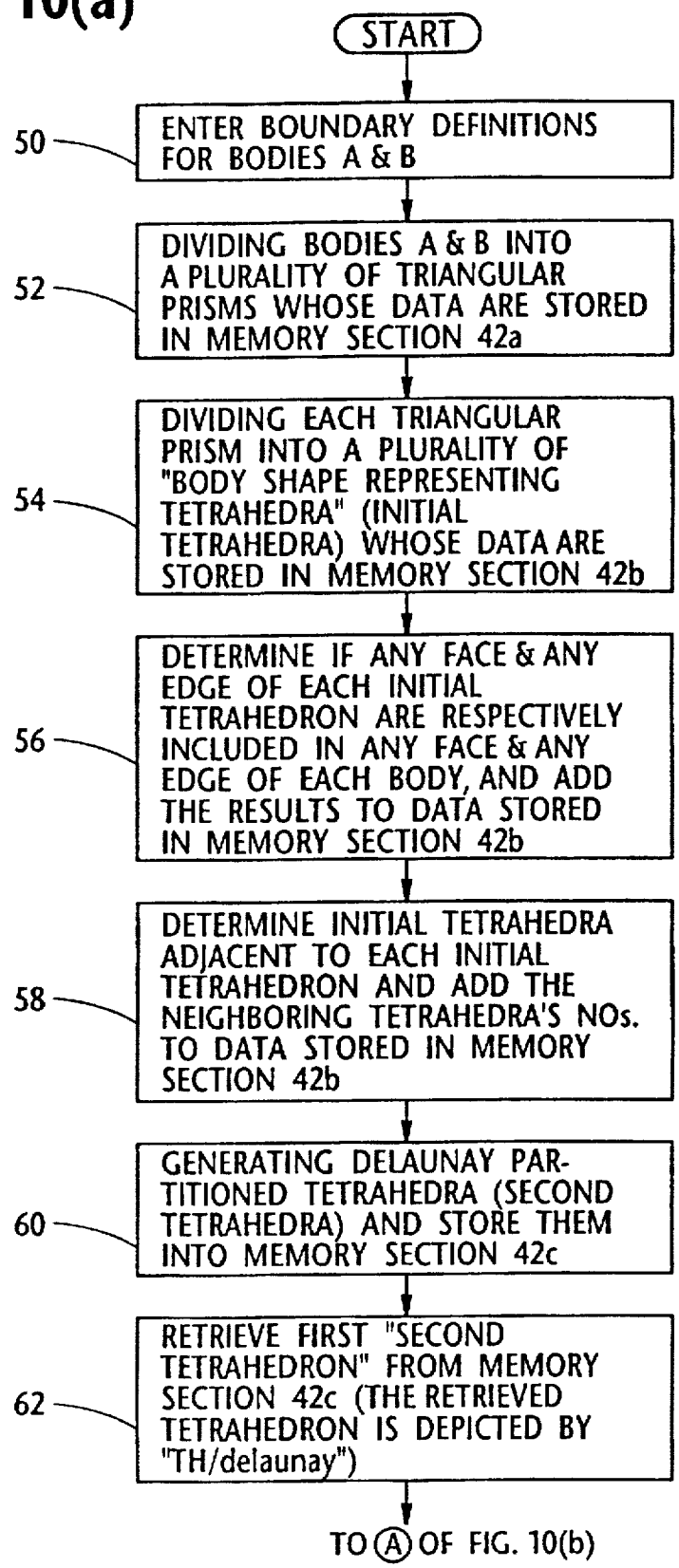

FIG. 12

TABLE INDICATING RELATIONSHIP BETWEEN
BODY AND BODY'S FACES/EDGES

| BODY 1 | FACE 1 | EDGE 1 | EDGE 7 |
|---|---|---|---|
| | FACE 2 | EDGE 2 | EDGE 8 |
| | FACE 3 | EDGE 3 | EDGE 9 |
| | FACE 4 | EDGE 4 | EDGE 10 |
| | FACE 5 | EDGE 5 | EDGE 11 |
| | FACE 6 | EDGE 6 | EDGE 12 |
| BODY 1 | FACE 7 | EDGE 13 | EDGE 19 |
| | FACE 8 | EDGE 14 | EDGE 20 |
| | FACE 9 | EDGE 15 | EDGE 21 |
| | FACE 10 | EDGE 16 | EDGE 22 |
| | FACE 11 | EDGE 17 | EDGE 23 |
| | FACE 12 | EDGE 18 | EDGE 24 |

FIG. 13

DATA ADDED TO MEMORY SECTION 42b

INITIAL TETRAHEDRON 1

- FACE 1 OF THE INITIAL TETRAHEDRON 1
  - (1) FACE NO. OF THE BODY (IF FACE 1 FORMS PART OF BODY'S FACE)
  - (2) NEIGHBORING INITIAL TETRAHEDRON NUMBERS
- FACE 2 OF THE INITIAL TETRAHEDRON 1
  - (1) FACE NO. OF THE BODY (IF FACE 2 FORMS PART OF BODY'S FACE)
  - (2) NEIGHBORING INITIAL TETRAHEDRON NUMBERS
- FACE 3 OF THE INITIAL TETRAHEDRON 1
  - (1) FACE NO. OF THE BODY (IF FACE 3 FORMS PART OF BODY'S FACE)
  - (2) NEIGHBORING INITIAL TETRAHEDRON NUMBERS
- FACE 4 OF THE INITIAL TETRAHEDRON 1
  - (1) FACE NO. OF THE BODY (IF FACE 4 FORMS PART OF BODY'S FACE)
  - (2) NEIGHBORING INITIAL TETRAHEDRON NUMBERS

- EDGE 1 OF THE INITIAL TETRAHEDRON 1
  - (1) EDGE NO. OF THE BODY (IF EDGE 1 FORMS PART OF BODY'S EDGE)
- EDGE 2 OF THE INITIAL TETRAHEDRON 1
  - (1) EDGE NO. OF THE BODY (IF EDGE 2 FORMS PART OF BODY'S EDGE)
- EDGE 3 OF THE INITIAL TETRAHEDRON 1
  - (1) EDGE NO. OF THE BODY (IF EDGE 3 FORMS PART OF BODY'S EDGE)
- EDGE 4 OF THE INITIAL TETRAHEDRON 1
  - (1) EDGE NO. OF THE BODY (IF EDGE 4 FORMS PART OF BODY'S EDGE)
- EDGE 5 OF THE INITIAL TETRAHEDRON 1
  - (1) EDGE NO. OF THE BODY (IF EDGE 5 FORMS PART OF BODY'S EDGE)
- EDGE 6 OF THE INITIAL TETRAHEDRON 1
  - (1) EDGE NO. OF THE BODY (IF EDGE 6 FORMS PART OF BODY'S EDGE)

MESH POINTS 1-4 OF THE INITIAL TETRAHEDRON 1

FIG. 14

DATA OF DELAUNAY PARTITIONED TETRAHEDRA
(DEPICTED BY SECOND TETRAHEDRA)
STORED IN MEMORY SECTION 42c

- SECOND TETRAHEDRON 1
- SECOND TETRAHEDRON 2
- SECOND TETRAHEDRON 3
- SECOND TETRAHEDRON 4
- SECOND TETRAHEDRON 5
- SECOND TETRAHEDRON 6
- SECOND TETRAHEDRON 7
- SECOND TETRAHEDRON 8
- •
- •
- •
- •
- •

FIG. 15

INTERSECTION DATA STORED IN MEMORY SECTION 42d
(SECOND TETRAHEDRON = DELAUNAY PARTITIONED
TETRAHEDRON)

INTERSECTION COORDINATE 1
    (1) INTERSECTING BODY NO.
        (1a) INTERSECTING FACE NO.
        (1b) INTERSECTING EDGE NO.
    (2) INTERSECTING SECOND TETRAHEDRON NO.
        (2a) INTERSECTING FACE NO.
        (2b) INTERSECTING EDGE NO.

INTERSECTION COORDINATE 2
    (1) INTERSECTING BODY NO.
        (1a) INTERSECTING FACE NO.
        (1b) INTERSECTING EDGE NO.
    (2) INTERSECTING SECOND TETRAHEDRON NO.
        (2a) INTERSECTING FACE NO.
        (2b) INTERSECTING EDGE NO.

INTERSECTION COORDINATE 3
    (1) INTERSECTING BODY NO.
        (1a) INTERSECTING FACE NO.
        (1b) INTERSECTING EDGE NO.
    (2) INTERSECTING SECOND TETRAHEDRON NO.
        (2a) INTERSECTING FACE NO.
        (2b) INTERSECTING EDGE NO.

METHOD FOR DETERMINING THE INTERSECTIONS OF DELAUNAY PARTITIONED TETRAHEDRA WITH THE BOUNDARY OF A BODY TO BE ANALYZED

This application is a continuation of application Ser. No. 08/453,711, filed May 30, 1995 now abandoned.

BACKGROUND OF THE INVENTION

1. Field of the Invention

The present invention relates generally to a three-dimensional mesh generation technique used in a device simulation, and more specifically to a technique used to search for intersections of Delaunay partitioned tetrahedra with the boundary of a body (or bodies) to be analyzed (or under analysis). The present invention is directed to improving CAD (computer-aided design) algorithms and is performed by a computer system in combination with a software program. While the present invention is discussed with reference to a semiconductor device simulation, it will be understood that the invention is also applicable to various other types simulations used in construction engineering, civil engineering, furniture and machine manufacture, etc.

2. Description of the Related Art

As is known in the art, semiconductor device simulation is used to calculate, using a computer system, physical or electrical characteristics of transistors' terminal currents, threshold voltages, etc. within a semiconductor body such as an LSI (Large Scale Integrated) chip. In order to optimize a semiconductor device so that it exhibits the most desirable electrical characteristics, simulation of the devise is a useful tool and enables drastic reduction in costs and time compared with trial manufacture of an LSI.

Device simulation is able to provide useful information of how electrons and holes behave within a semiconductor device. The information thus obtained may be utilized to investigate causes of impact ionization (for example) which is objectionable when manufacturing miniaturized MOSFETs (metal-oxide-semiconductor field-effect-transistors).

In order to obtain physical or electrical characteristics of a semiconductor device by way of simulation, it is necessary to solve partial differential equations such as Poisson's equations, current continuity equations, etc. which indicate relationships between electrical potentials and carrier densities.

Before turning to the present invention, it is deemed advantageous to discuss prior art techniques with reference to the drawings attached to the instant specification.

In a book entitled "Process Device Simulation Techniques" by Ryo DAN, published 1988 by Sangyo Tosho, pp. 91–123 (Prior Art 1), partial differential equations are solved by partitioning a cross-section of a device into a plurality of small elements for discretizing partial differential equations.

The method proposed by Ryo DAN is briefly discussed with reference to FIGS. 1(a)–1(c). According to Ryo DAN, a cross-section of a FET (FIG. 1(a)) is divided or partitioned into a plurality of rectangle elements (FIG. 1(b)), and a current is defined between adjacent mesh points. As best shown in FIG. 1(c) illustrating an enlarged portion of FIG. 1(b), each mesh point is connected to four neighboring mesh points via four mesh lines. A cross-section is defined by intersection of a perpendicular bisector of a mesh line and, a current ($J_i$, $J_{i-1}$, $J_k$, or $J_{k-1}$) between two neighboring mesh points is integrated at the cross-section.

However, in the case where a slope is included in the Ryo DAN's cross-section, the slope is approximated by steps formed by rectangles and thus, it is not expected to precisely exhibit the cross-section.

One example for overcoming the above mentioned drawbacks of Prior Art 1 is to partition a cross-section of a semiconductor device into a plurality of triangle elements. Such technique is disclosed in a paper entitled "Iterative methods in semiconductor device simulation" by Conor S. Rafferty, et al., IEEE Trans. on ED, Vol. ED-32, No. 10, October 1985 (Prior Art 2).

Prior Art 2 is described with reference to FIGS. 2(a)–2(c), 3(a) and 3(b).

FIGS. 2(a)–2(c) are diagrams each being copied from the paper of Prior Art 2. FIG. 2(a) is a cross-section of a trench isolated CMOS (complementary metal oxide semiconductor) device to be analyzed (or under analysis). FIG. 2(b) shows a triangular meshes or grids covering the topology of the structure of FIG. 2(a), while FIG. 2(c) shows working meshes which have locally been subjected to mesh refinement. Triangles which require refinement are subdivided into four congruent subtriangle by joining the midpoints of the sides. Since the device structure is covered by a plurality of triangular elements, the trench can exactly be represented thereby.

As shown in FIG. 3(a), each of the mesh points shown in FIG. 2(c) is coupled to neighboring mesh points via branches. A current J flowing between two neighboring mesh points is integrated at a cross-section of a corresponding branch. The cross-section of the current path is represented by a line coupling two circumcenters of two neighboring triangles. As a result, it is absolutely necessary that the circumcenters of the adjacent triangles do not intersect with each other. This is because if this happens (viz., in the case of occurrence of intersection of the circumcenters of the adjacent triangles), the cross-section of the path, at which currents are integrated, is rendered negative. If the above mentioned condition is not satisfied, a spurious spike (viz., a quasi-Fermi potential) of 50V (for example) appears, as shown in FIG. 3(b), which is physically unimaginable or illogical. In order to satisfy the condition that the circumcenters of the two adjacent triangles do not intersect with each other, it is necessary to assure Delaunay partitioning (or triangulation) that any given triangle's circumcircle does not include a vertex of any other triangle.

Recent years' miniaturization of MOSFETs necessitates a three-dimensional device simulation which involves analysis of the device body in order to investigate narrow channel effects of a MOSFET. With the three-dimensional device simulation, it is known in the art to partition the semiconductor device body structure into a plurality of tetrahedra. In this case, a current is defined on each edge of the tetrahedra, while the cross-section of the current path is represented by a plane defined by circumcenters of a set or group of tetrahedra which share the edge. As in the two-dimensional device simulation, the body should be Delaunay partitioned in the three-dimensional case in order to assure that a circumsphere for one tetrahedra does not include therewithin any vertex of any other tetrahedra. This is discussed in a paper entitled "Tetrahedral elements and the Scharfetter-Gummel method" by M. S. Mock, Proceeding of the NASECODE IV (1985), pages 36–47 (Prior Art 3). This prior art will be discussed later.

In the Japanese Laid-open Patent Application No. 3-214266 filed Jan. 19, 1990 (Prior Art 4), a known tetrahedral partitioning technique is disclosed. The invention disclosed in Prior Art 4 was made by the same inventor of the instant case.

Prior Art 4 is described in conjunction with FIGS. 4(a)–4(g). FIG. 4(a) illustrates a body A which includes therewithin a body B.

Firstly, all the vertices of the body B are projected onto a x-y plane which defines one face of the body A (FIG. 4(b)). Secondly, the x-y plane is partitioned into a plurality of triangles as shown in FIGS. 4(c) and 4(d) along with a known technique taught by D. F. Watson, in a magazine entitled "The Computer Journal", Volume 24, No. 2 (1981), pp. 167–170 (Prior Art 5). Thirdly, a plurality of lines from the vertices projected on the x-y plane are extended in the direction parallel with the z-axis thereby to generate a plurality of triangular prisms (only one is shown in FIG. 4(e)). In FIG. 4(e), lines L1–L4 each represents a line along which the triangular prism of FIG. 4(e) intersects the body B.

Following this, the coordinates which specify intersections of the faces of the body B with each triangular prism are calculated. As shown in FIG. 4(f), a set of triangular prisms which share a vertical line L5 is determined. Subsequently, a mesh point $h_2$ is added to an appropriate point on the line L5, and four tetrahedra defined by $h_1$-$h_2$-$j_1$-$k_1$, $h_1$-$h_2$-$k_1$-$m_1$, $h_1$-$h_2$-$m_1$-$n_1$, and $h_1$-$h_2$-$p_1$-$j_1$ are generated. In this case, care must be paid in order that any generated tetrahedron does not intersect the boundary of the body B. Thus procedure continues on a new set of prisms sharing a vertical line L6 (for example). In this case, an appropriate point $j_2$ is created on the line L6 and four tetrahedra are generated in a manner similar to the above. Thus, the bodies A and B are divided into a plurality of tetrahedra as illustrated in FIG. 4(g).

The method according to the Prior Art 4 is able to implement the tetrahedral partitioning at high speed in that the triangular data includes the boundary information of the body B. However, the method of Prior Art 4 suffers from the drawback in that it does not necessarily satisfy the Delaunay partitioning that a circumsphere of a given tetrahedron does not include therewithin any vertex of other circumspheres.

Returning to Prior Art 3 (M. S. Mock), the M. C. Mock's method applied to two-dimensional Delaunay triangulation is firstly described for the sake of a better understanding of the M. C. Mock's three-dimensional tetrahedrization.

According to M. C. Mock, an initial mesh of Delaunay partitioned triangles is firstly generated. It is assumed that a rectangular region C to be analyzed contains an arbitrarily shaped region D (FIG. 5(a)). The initial Delaunay triangulation is implemented by dividing the rectangle region C into two triangles by a diagonal line (FIG. 5(b)). Thereafter, the rectangle region C is further subjected to triangulation by adding unique or feature points of the region D on a one-by-one basis.

After generating the aforesaid initial mesh of Delaunay partitioned triangles, further Delaunay triangulation is implemented on the initially generated mesh in order to increase calculation accuracy of the body to be analyzed. That is, a new mesh point E is added to the initial mesh of Delauney-generated triangles (FIG. 6(a)). In this case, all triangles each of which has a circumcircle including the new mesh point E are determined (FIG. 6(a)). The triangles thus determined are then deleted to define a region F which is determined by the deleted triangles (FIG. 6(b)). Thereafter, as shown in FIG. 6(c), the new mesh point E is connected to each of the mesh points of the region F thereby to generate a plurality (i.e., five) of new triangles TR1–TR5 which satisfy the Delaunay triangulation.

The above mentioned M. C. Mock's algorithm is such as to recursively refine or subdivide the already-divided triangles which meet the Delaunay partition.

However, the M. C. Mock's algorithm suffers from the difficulty in that it often occurs that a newly generated triangle may intersect the region boundary.

As is well known, semiconductor device simulation is to represent device's elements, such as electrical connection lines, dielectric regions, etc., by a set of triangles. Therefore, if a newly generated triangle(s) intersects any boundary defining adjacent elements, it is no longer expected to precisely analyze the model.

The above mentioned M. S. Mock's Delaunay triangulation algorithm holds for a three-dimensional case. That is, every time a new vertex is added for generation of new tetrahedra, the tetrahedra each including therewithin the newly added vertex, are deleted. It follows therefore, that the new tetrahedron may intersect the boundaries of a body to be analyzed. In such a case, the body is no longer precisely modeled.

Therefore, with the Delaunay tetrahedrization, it is vital to examine each intersection of a newly generated tetrahedron with respect to the boundary of a body (bodies) to be analyzed.

Hereinlater, two known techniques (Prior Art 6 and 7) are discussed which may be more relevant to the present invention than the above mentioned conventional techniques (viz., Prior Art 1–5).

The Prior Art 6 is a very primitive but the most reliable one. That is, after a body is divided into a plurality of Delaunay partitioned tetrahedra, each of the Delaunay-generated tetrahedra is checked to determine if each of the four faces of the tetrahedron intersects each of the six edges of the body and also if each of the six edges of the tetrahedron intersects each of the four faces of the body. However, this intersection procedure is implemented successively on every tetrahedra without exception and thus, a very long computation time is inevitably required. As a result, if the body shape is complicated then this prior art requires too much time and is not practical.

Before discussing the Prior Art 7 in detail, reference to two types of intersection of a newly generated tetrahedron with the body will be made.

FIG. 7(a) illustrates one type of intersection wherein the faces of a tetrahedron 10 intersect or pass through an edge of a body 12, while FIG. 7(b) shows the other type of intersection wherein the tetrahedron 10 has its faces intersected by the face of the body 12. When the intersections are investigated or checked, the coordinates of the intersections are eliminated by adding a new mesh point(s) at the intersection.

The Prior Art 7 is disclosed in the U.S. Pat. No. 5,125,038 Meshkat et al. and is briefly described with reference to FIGS. 8(a) and 8(b). According to this prior art, in the case where one vertex 14 (FIG. 8(a)) of a certain tetrahedron is located on an edge 16 of a body 18 to be analyzed, the tetrahedron is checked to determine if any face thereof intersects the edge 16. Further, in the case where an edge 20 of a certain tetrahedron is an edge segment of the body 18, the edges of the tetrahedron are checked to determine if any edge intersects any face of the body 18.

However, the intersection determination according to Prior Art 7 is limited only to the above mentioned two cases (FIGS. 8(a) and 8(b)) and thus, this prior art 7 is unable to determine if a tetrahedron has a face intersecting a face of the body 18 as shown in FIG. 8(c) which corresponds to FIG. 7(b).

Accordingly, as will be understood from the above, it is highly desirable to be able to speed up the intersection determination of each Delaunay partitioned tetrahedron with respect to the boundary (viz., faces and edges of each tetrahedron) of a body without missing any occurrence of an intersection.

SUMMARY OF THE INVENTION

It is an object of the present invention is to provide a high speed method for determining intersections of each of the Delaunay partitioned tetrahedra with the boundary of a body (or bodies) to be analyzed.

Another object of the present invention is to provide a method for determining an intersection of each of the Delaunay partitioned tetrahedra with the boundaries of a body (bodies) to be analyzed without missing any occurrence of intersection.

In brief, these objects are fulfilled by a technique wherein a plurality of first tetrahedra are firstly produced by dividing the body into a plurality of triangular prisms and then dividing each triangular prism into a plurality of tetrahedra. Any face of each of the first tetrahedra, which is a face segment of the body, is found. Further, any edge of each first tetrahedron, which is an edge segment of the body is found. Subsequently, a plurality of second tetrahedra are generated each of which is Delaunay partitioned. Following this, the following steps are cyclically implemented to investigate in sequence all of the second tetrahedra. A unique point within the second tetrahedron is determined and then, a third tetrahedron which includes the unique point therewithin is determined among the first tetrahedra. A check is made to determine if any edge of the third tetrahedron, which is an edge segment of the body, intersects any face of the second tetrahedron, and to determine if any face of the third tetrahedron, which is a face segment of the body, intersects any edge of the second tetrahedron. Intersection information is obtained if an outcome of an enquiry at one of steps (g) and (h) is affirmative.

An aspect of the present invention resides in a method for determining an intersection of a boundary of a body with each of Delaunay partitioned tetrahedra, the body exhibiting edges and faces, the method implemented by a computer system in a combination with a software program, the method comprising the steps of: (a) producing a plurality of first tetrahedra by dividing the body into a plurality of triangular prisms and then dividing each triangular prism into a plurality of tetrahedra; (b) finding any face of each first tetrahedron, which is a face segment of the body, and finding any edge of each first tetrahedron which is an edge segment of the body; (c) producing a plurality of second tetrahedra based on the first tetrahedra, each of the second tetrahedra being Delaunay partitioned; (d) cyclically implementing following steps (e)–(i) to investigate in sequence all of the second tetrahedra; (e) finding a unique point within the second tetrahedron; (f) finding, among the first tetrahedra, a third tetrahedron which includes the unique point therewithin; (g) determining if any edge of the third tetrahedron, which is an edge segment of the body, intersects any face of the second tetrahedron; (h) determining if any face of the third tetrahedron, which is a face segment of the body, intersects any edge of the second tetrahedron; and (i) obtaining intersection information if an outcome of an enquiry at one of steps (g) and (h) is affirmative;

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 10(a) and 10(b) are a flow diagram of intersection determination embodying the present invention;

FIG. 12 is a table used for implementing the present invention;

FIG. 13 is a diagram showing data stored in a memory section of the computer system of FIG. 9;

FIG. 14 is a diagram showing data stored in a memory section of the computer system of FIG. 9; and FIG. 15 is a diagram showing data stored in a memory section of the computer system of FIG. 9.

DETAILED DESCRIPTION OF THE PREFERRED EMBODIMENTS

A preferred embodiment of the present invention is described with reference to FIGS. 9–15.

Figure 9:
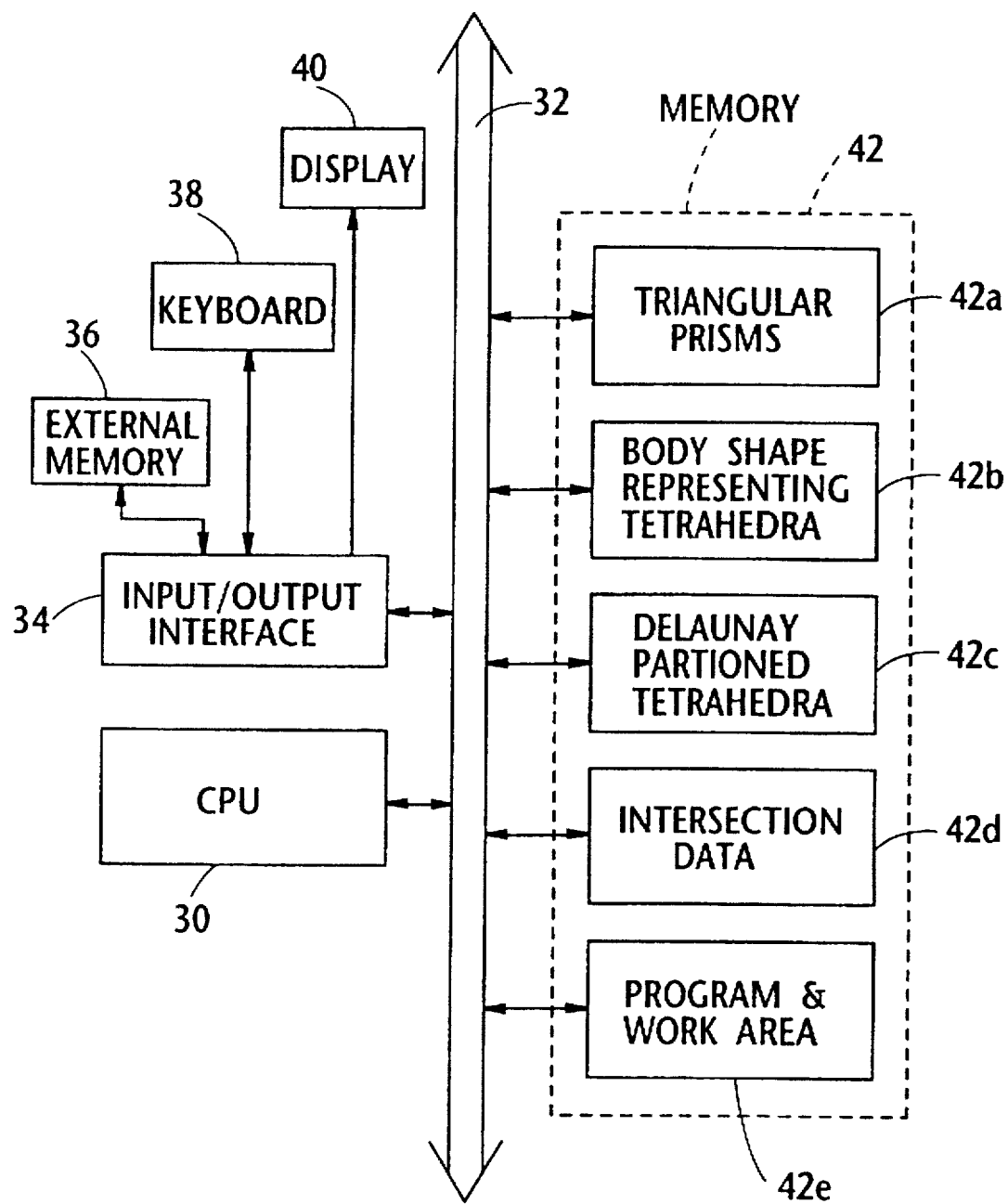
FIG. 9 is a block diagram schematically showing a computer system for implementing the present invention.

FIG. 9 is a diagram schematically showing an exemplary computer system used to implement the present invention.

The computer system of FIG. 9 is provided with a CPU (central processing unit) 30 for controlling an overall operation of the system via a bus 32. An input/output interface 34 is provided between the bus 32 and external devices such as an external memory means 36 (hard disk driver and/or floppy disk driver), a keyboard 38, a display 40, etc. A memory 42 in the form of a RAM (random access memory) of an appropriate capacity is functionally divided into a plurality of memory sections (depicted by 42a–42e) for storing various data obtained while implementing the invention. An execution program is transferred from the external memory means 36 to the system and then stored in the memory section 42e which is also used for a working area. FIG. 9 is again referred to in the following description.

Figure 10B:
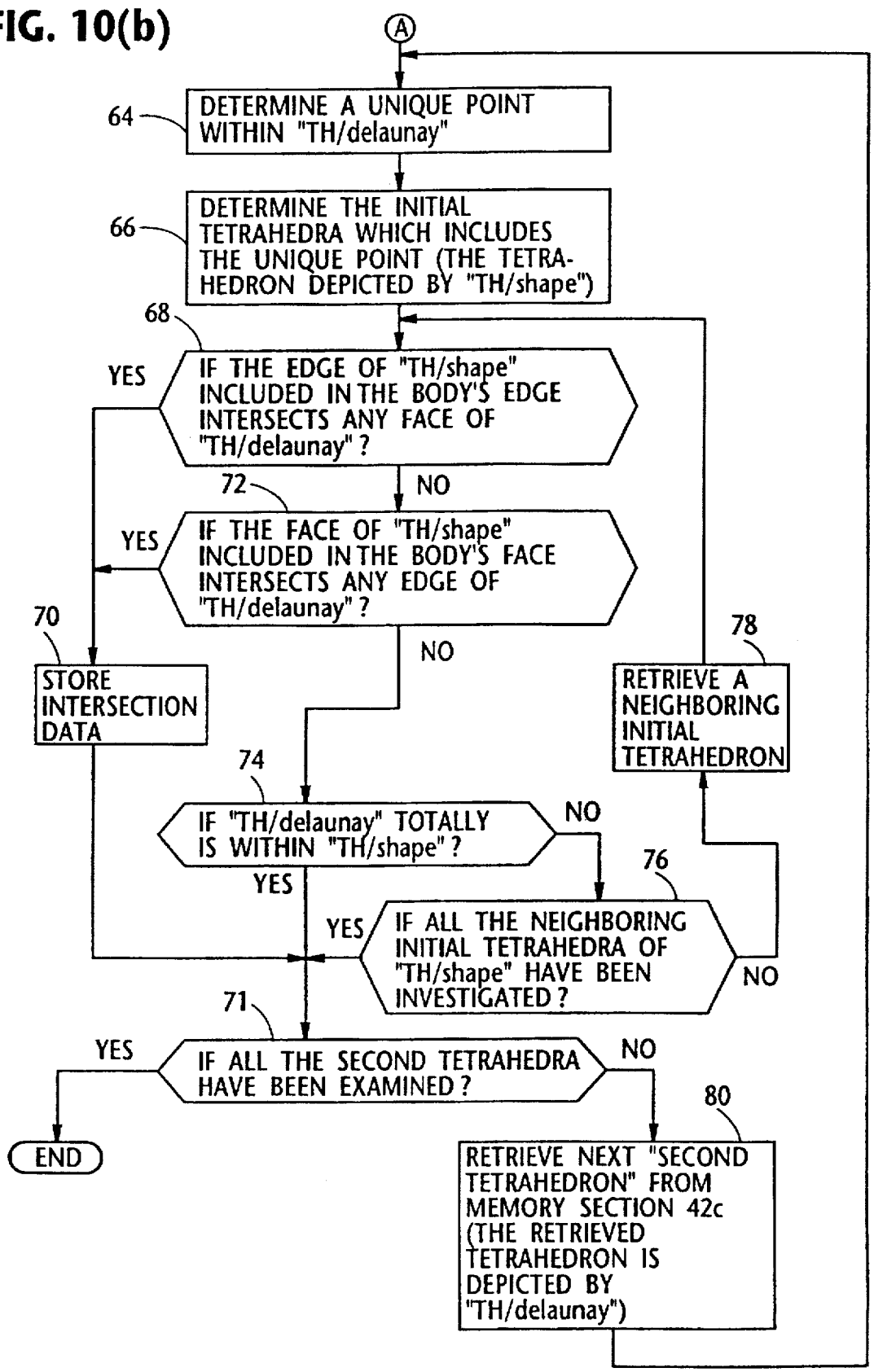

Turning to FIGS. 10(a) and 10(b), a high level flow diagram of the intersection determining procedure is described.

Figure 1A:
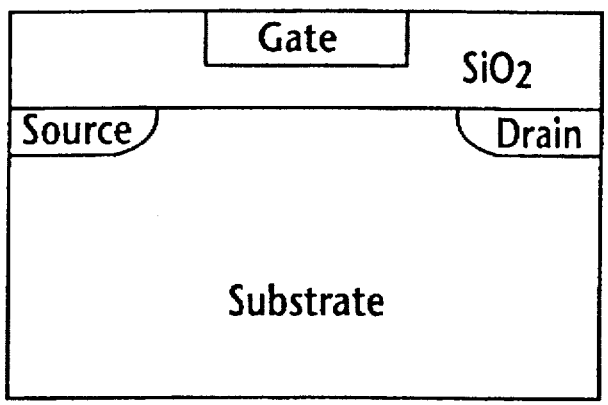
FIG. 1(a) is a cross-section of a semiconductor device referred to in a discussion of a known method in the opening paragraphs of the instant disclosure.
Figure 1B:
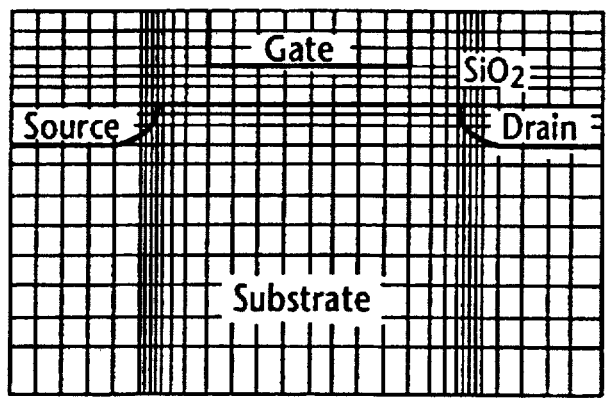
FIG. 1(b) is a diagram showing a rectangularly divided cross-section of FIG. 1(a)
Figure 1C:
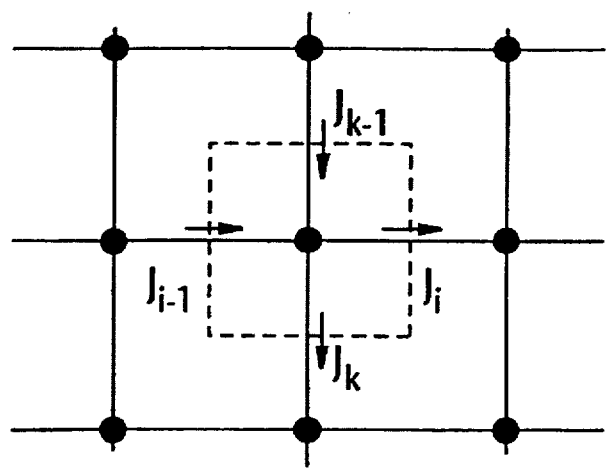
FIG. 1(c) is a diagram showing an enlarged portion of part of FIG. 1(b)
Figure 2A:
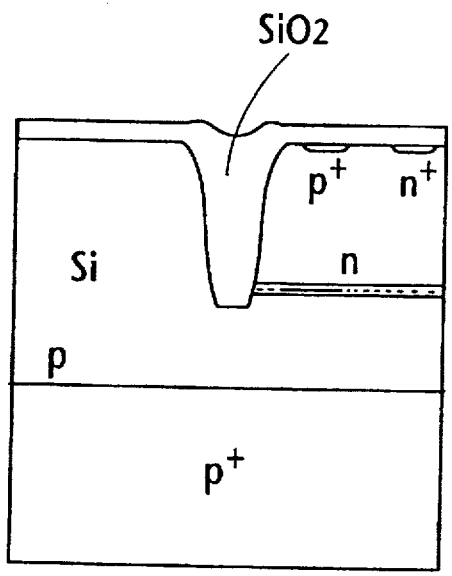
FIG. 2(a) is a cross-section of a trench isolated CMOS device referred to in a discussion of a known method in the opening paragraphs of the instant disclosure.
Figure 2B:
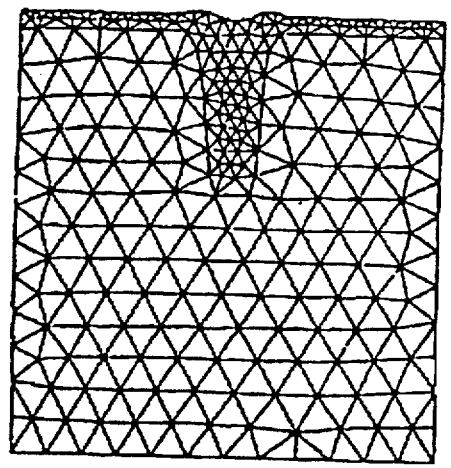
FIG. 2(b) is a diagram showing a Delaunay triangulation of the cross-section of FIG. 2(a)
Figure 2C:
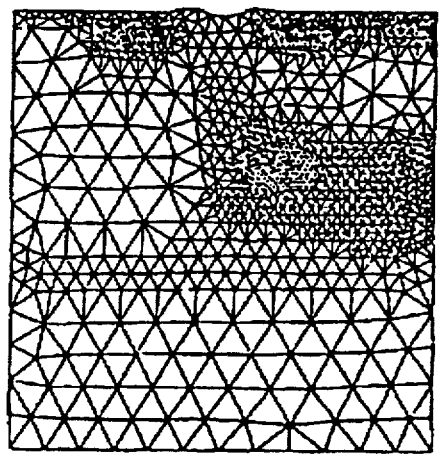
FIG. 2(c) is a diagram showing a refinement of the triangles of FIG. 2(b)
Figure 3A:
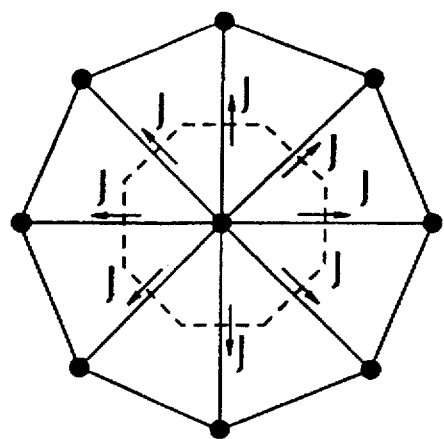
FIG. 3(a) is a sketch depicting current paths defined between neighboring mesh points of FIG. 2(c)
Figure 3B:
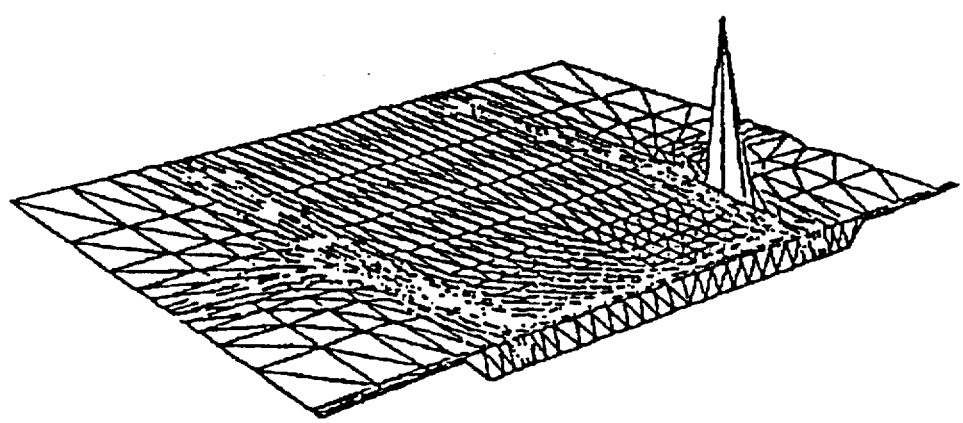
FIG. 3(b) is a diagram showing a quasi-Fermi potential inherent in the known method discussed with FIGS. 2(a)–2(c) and 3(a)
Figure 4A:
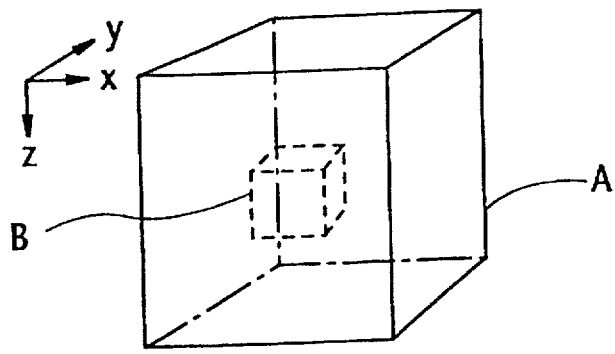
FIG. 4(a) is a diagram showing two bodies A and B for analysis according to a known method.
Figure 4B:
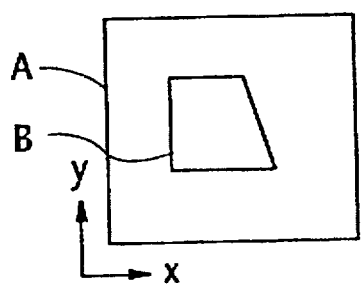
FIG. 4(b) is a diagram showing a projection of the vertices of the body B of FIG. 4(a) onto a x-y plane.
Figure 4C:
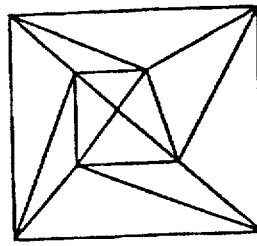
FIGS. 4(c) and 4(d) are diagrams each showing a plurality of triangles formed on the x-y plane of FIG. 4(b)
Figure 4D:
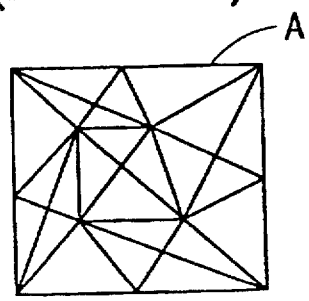
Figure 4E:
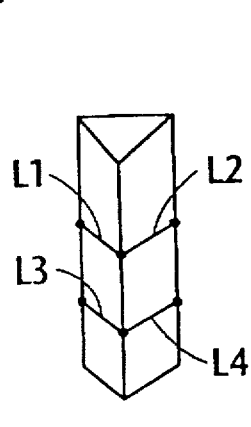
FIG. 4(e) is a diagram showing a triangular prism generated based on one of the triangles of FIG. 4(d)
Figure 4F:
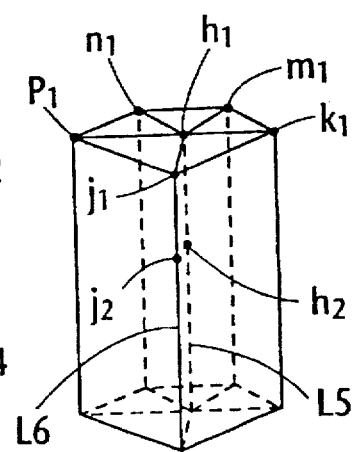
FIG. 4(f) is a diagram showing a set of triangular prisms which share one prism's edge.
Figure 4G:
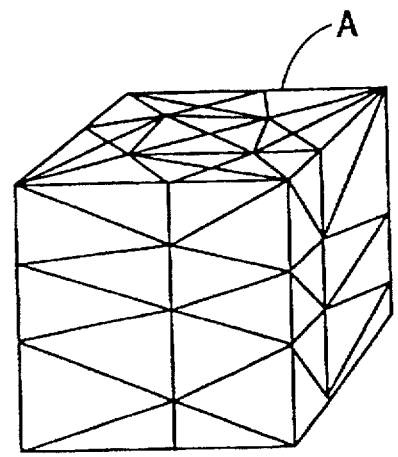
FIG. 4(g) is a diagram showing a mesh of triangular prisms representing the shapes of the bodies A and B of FIG. 4(a)
Figure 5A:
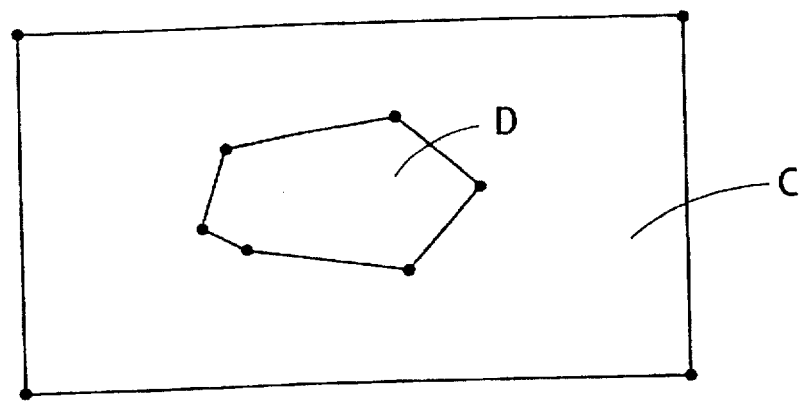
FIGS 5(a), 5(b) and 5(c) are diagrams showing a Delaunay triangulation technique according to a known method.
Figure 5B:
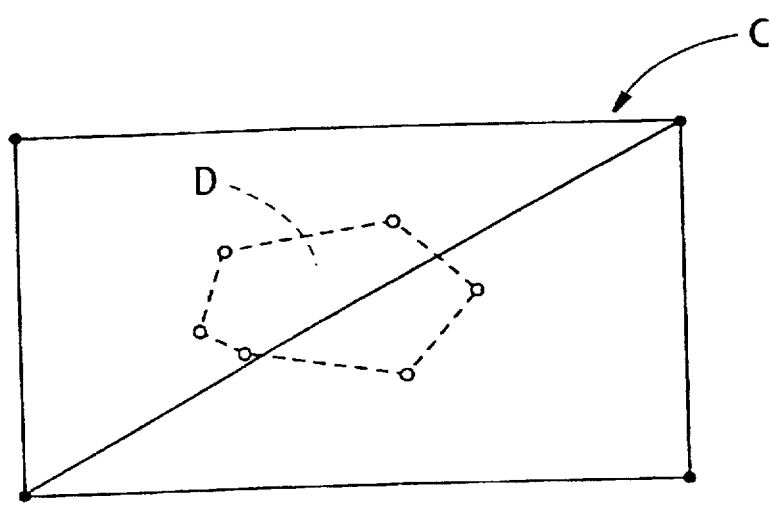
Figure 5C:
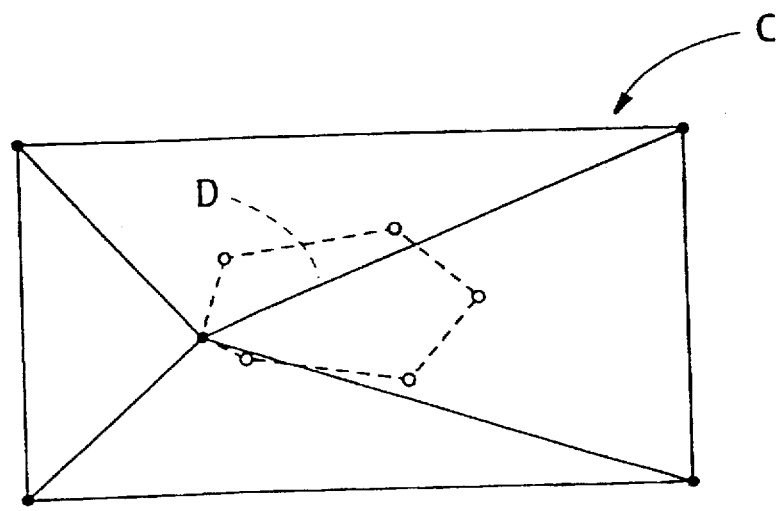

The inputs to the intersect determining procedure are boundary definitions for one or more than one bodies to be analyzed (step 50). In order to simplify the description of the embodiment, it is assumed that the two bodies A and B shown in FIG. 4(a) are to be analyzed. The bodies A and B are respectively depicted by bodies 1 and 2 for convenience of description. It is to be noted that the following discussion is easily extendable to the case where more than two bodies are to be analyzed with respect to intersections with Delaunay divided tetrahedra.

The generation of triangular prisms (step 52) and the subsequent generation of the body shape representing (or indicating) tetrahedra (step 54) have been described with reference to Prior Art 4 (FIGS. 4(a)–4(g)) and thus, further description thereof is omitted for brevity. It should be noted, however, that the present invention is in no way limited to the technique discussed with FIGS. 4(a)–4(g).

Figure 11:
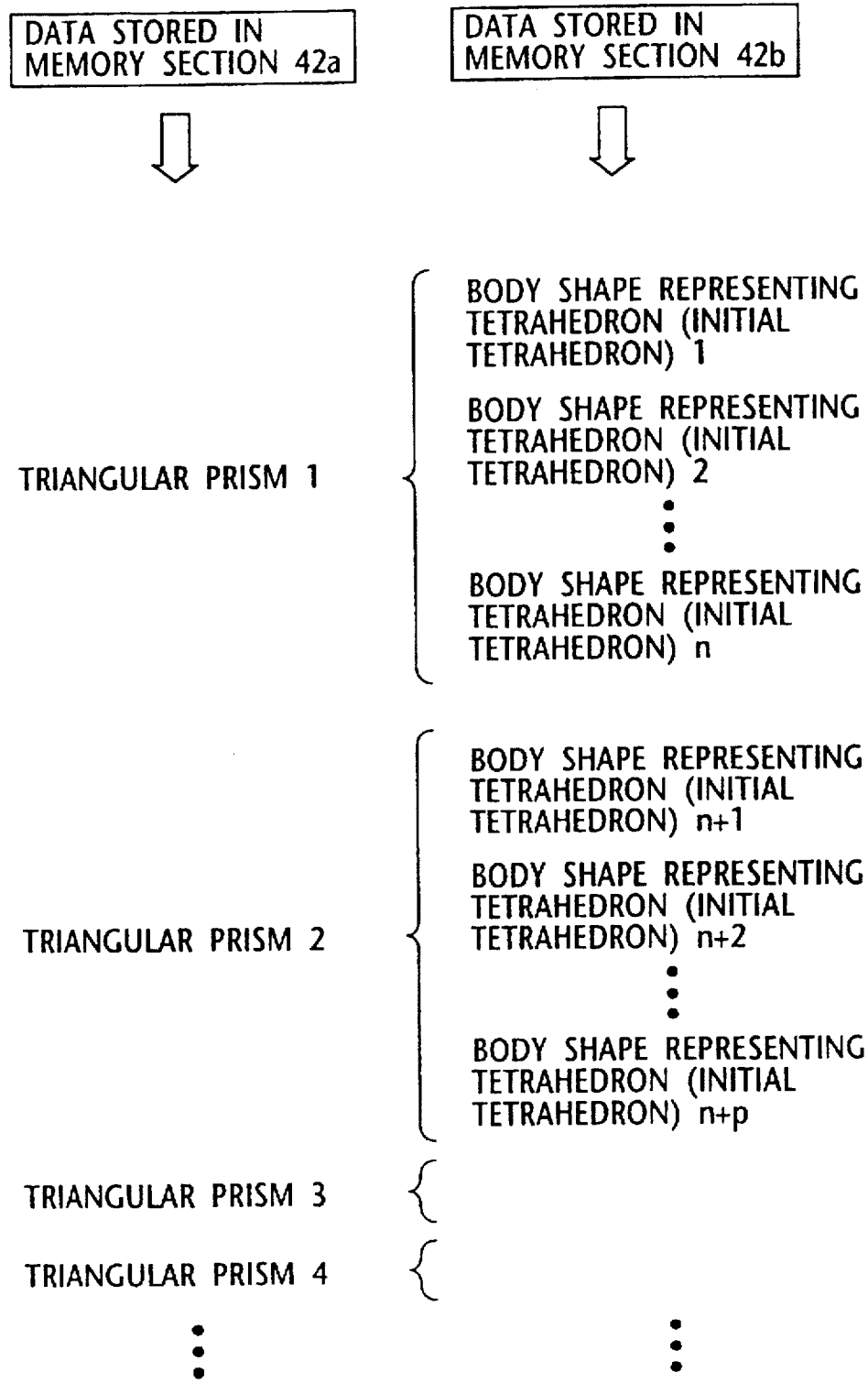
FIG. 11 is a diagram showing data stored in memory sections of the computer system shown in FIG. 9.

Data of the triangular prisms generated at step 52 are stored in the memory section 42a of FIG. 9, while the initial mesh data of body shape representing tetrahedra (viz., initial tetrahedra) are stored in the memory section 42b of FIG. 9. When the prisms and the initial tetrahedra are stored, they are numbered in order to be referred to in the later procedure. The data stored in the memory sections 42a and 42b are shown in FIG. 11 in a very schematic manner.

Subsequently, the program proceeds to step 56 whereat the following data are obtained. That is, in the event that any edge of a given initial tetrahedron forms part of any edge of the bodies 1 and 2, such boundary (or segment) data is added to the corresponding initial tetrahedron data already stored in the memory section 42b. Similarly, in the event that any face of an initial tetrahedron forms part of the body's face, such segment data is added to the data of the corresponding initial tetrahedron stored in the memory section 42b.

It is preferable to provide all the faces and edges of each of the bodies 1 and 2 with different ID (identification) numbers as shown in FIG. 12. Thus, when the ID number of a given face (or edge) is known, the body can be specified.

FIG. 13 shows the data added to the memory section 42b with respect to the initial tetrahedron 1. As shown, if the face 1 of the initial tetrahedron 1 forms part of any face of a body 1 or 2, the face ID number is added to the memory section 42b. Similarly, if the edge 1 of the initial tetrahedron 1 forms part of any face of a body 1 or 2, the edge ID number is added to the memory section 42b. Further, numbers of the mesh points 1–4 of the initial tetrahedron 1 are also added to the memory section 42b. The above description is also applicable to the other initial tetrahedra.

As just mentioned above, only the ID numbers of the faces, edges, and mesh points of each initial tetrahedron are stored in the memory section 42b. The actual data defining the locations thereof are separately stored in the mesh section 42e (for example). The separate storing of the ID numbers with respect to the actual data may be advantageous from a practical point of view. That is, this technique may make it easy to establish the system for implementing the present invention.

At step 58 the initial tetrahedra are individually checked if they are adjacent to any other initial tetrahedra. The adjacent two tetrahedra imply two tetrahedra sharing a common face and therefore, each body shape representing tetrahedron is adjacent to four tetrahedra if the first mentioned tetrahedron does not form the boundary of the body A (i.e., body 1). The ID numbers of adjacent tetrahedra are stored in the memory section 42b (see FIG. 13).

Figure 6A:
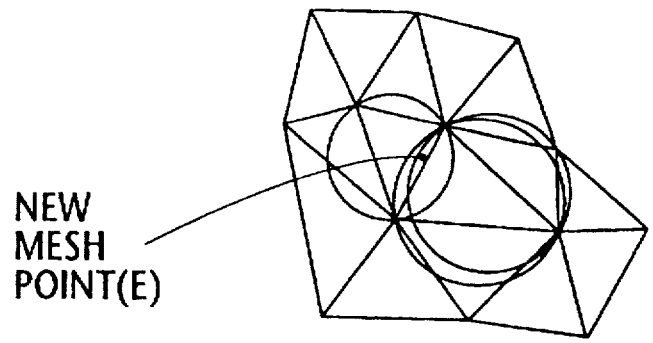
FIGS. 6(a), 6(b) and 6(c) are diagrams showing how the Delaunay partitioned triangles generated using the technique shown in FIGS. 5(a)–5(c), are subjected to further Delaunay triangulation.
Figure 6B:
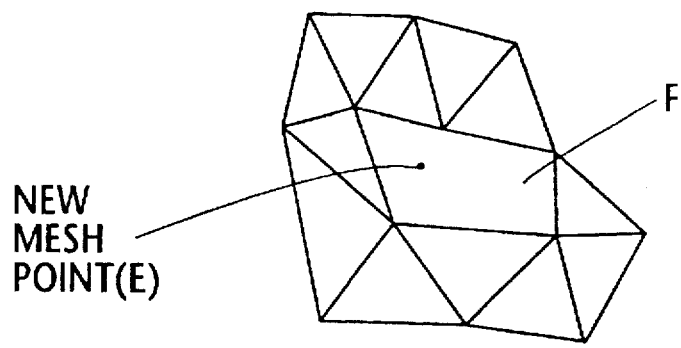
Figure 6C:
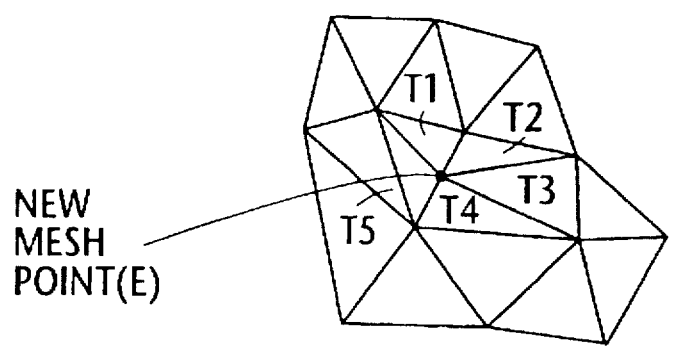
Figure 7A:
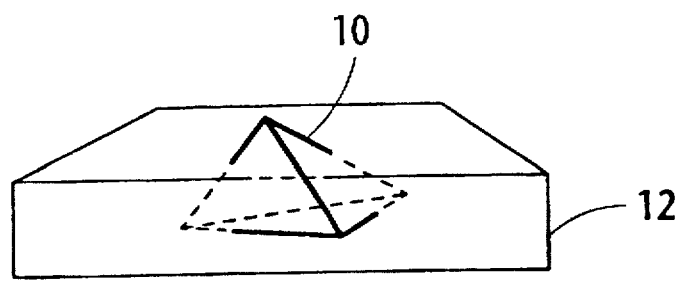
FIGS. 7(a) and 7(b) are diagrams showing two cases where a Delaunay partitioned tetrahedra intersects a body to be analyzed (or under analysis)
Figure 7B:
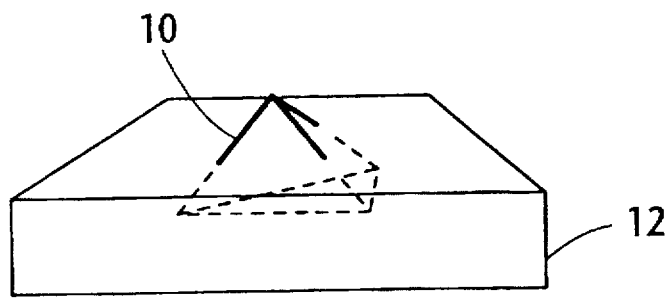
Figure 8A:
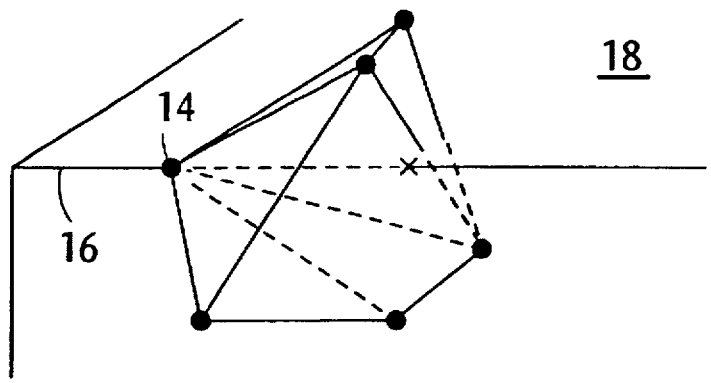
FIGS. 8(a) and 8(b) are diagrams showing two cases where a Delaunay partitioned tetrahedra intersects a body according to a known method.
Figure 8B:
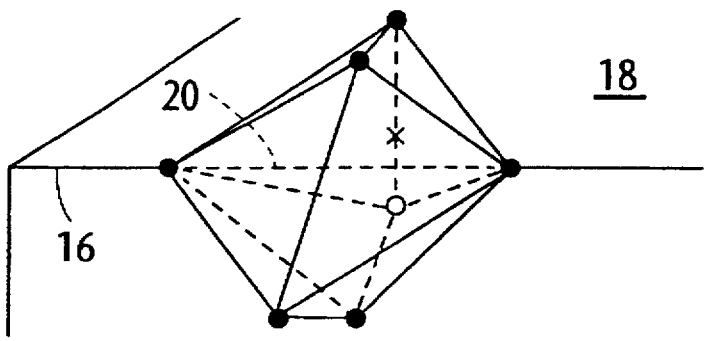
Figure 8C:
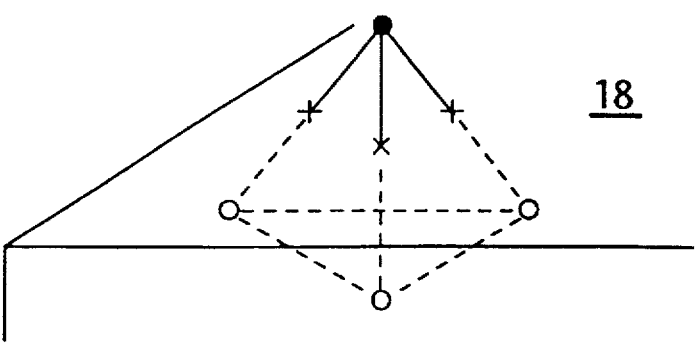
FIG. 8(c) is a diagram showing a case of intersection of a Delaunay partitioned tetrahedra with a body, which intersection is unable to be searched by the known method described with reference to FIGS. 8(a) and 8(b)

At step 60 the initial mesh of tetrahedra is Delaunay partitioned. The Delaunay partitioning, which has been discussed with respect to FIGS. 6(a)–6(c) (viz., the M. S. Mock's method in three dimensions), can be applied to the procedure at step 60 and thus, further discussion thereof is omitted for simplifying the description. All the Delaunay partitioned tetrahedra generated (viz., data thereof) are stored at step 60 in the memory section 42c together with ID (identification) numbers for specifying individual tetrahedra.

FIG. 14 is a diagram schematically showing the Delaunay partitioned tetrahedra 1, 2, 3, ... whose data are stored in the memory section 42c. As is known in the art, the data of each Delaunay partitioned tetrahedron are the coordinates of the four vertices and information how to connect the vertices for determining the faces. It is to be noted that FIG. 14 does not show in detail the data for simplifying the description.

In the following steps, the Delaunay partitioned tetrahedra are sequentially checked to determine if each tetrahedron intersects the boundary of each body.

At step 62 the first Delaunay partitioned tetrahedron is retrieved from the memory section 42c. The Delaunay partitioned tetrahedron retrieved from the memory section 42c is depicted by "TH/delaunay" merely for the sake of convenience of description.

At step 64 a unique or characteristic point, which is definitely located within the tetrahedron, is determined. Such a unique point may be the bary-center or the inner center of the Delaunay partitioned tetrahedron.

At step 66 the initial (viz., body shape representing) tetrahedron, which includes therewithin the unique point, is determined. In order to ascertain such an initial tetrahedron, it is firstly determined which triangular prism includes the unique point by projecting the unique point onto the x-y plane (see FIG. 4(b)). Thereafter, all of the initial tetrahedra included in the triangular prism are individually checked until the initial tetrahedron including the unique point is determined. The ID number of the initial tetrahedron including the unique point is retained in the memory section 42e (for example). Such an initial tetrahedron is depicted by "TH/shape" for the sake of the convenience of description.

At step 68 a check is made to determine if any edge of the tetrahedron "TH/shape", included in the body's edge, intersects or goes through any face of the Delaunay partitioned tetrahedra "TH/delaunay". If the answer is affirmative then the program goes to step 70 whereat intersection data is stored into the memory section 42d and then the program goes to step 71.

If the outcome at step 68 is negative, the program proceeds to step 72 whereat it is checked to see if any face of the tetrahedron "TH/shape ", included in the body's face, intersects any edge of the tetrahedron "TH/delaunay". If the answer if affirmative at step 72, the routine flows to step 70 wherein intersection data is stored and then the routine flows to step 71. If the answer at step 72 is negative, the program proceeds to step 74 whereat it is checked to see if the tetrahedron "TH/delaunay" is totally within the tetrahedron "TH/shape". If the outcome of the enquiry implemented at step 74 is negative, a check is made to see if all the tetrahedra adjacent to "TH/shape " have already been investigated (step 76). In the event that the tetrahedron "TH/delaunay" is totally within the tetrahedron "TH/shape", the program proceeds to step 71. If the answer at step 76 is NO, then the program proceeds to step 78 whereat one of the neighboring initial tetrahedra, which have not yet been checked at steps 68 and 72, is retrieved and the program returns to step 68. Subsequently, the above mentioned steps are implemented.

FIG. 15 shows the intersection data stored in the memory 42d of FIG. 9. If the program proceeds from step 68 to step 70, the intersecting face number of the tetrahedron "TH/delaunay" and the intersecting edge number of the body are stored ((1a) and 2(b) of FIG. 15). On the other hand, if the program proceeds from step 72 to step 70, the intersecting edge number of the tetrahedron "TH/delaunay" and the intersecting face number of the body are stored ((1b) and 2(a) of FIG. 15). Thus, a plurality of intersection coordinates are determined.

At step 76 if the outcome of the enquiry implemented at step 76 is YES, the program flows to step 71 whereat it is checked to see if all the second tetrahedra (viz., Delaunay partitioned tetrahedra) have already been examined. If the answer is positive at step 71 then the program terminates. On the contrary, if all the second tetrahedra have not yet been examined, the routine proceeds to step 80 whereat the next "second tetrahedron" is retrieved from the memory section 42c and then the routine goes back to step 64. Following this, the above mentioned steps are again implemented.

When the program shown in FIGS. 10(a) and 10(b) are completed, new mesh points are sequentially added to the intersection points each specified by the intersection coordinate. Thus, the intersections of the Delaunay partitioned tetrahedron with the boundaries of the bodies can be deleted.

In the above, the present invention has been discussed with the case where the two bodies A and B are to be analyzed as shown in FIG. 4(a). However, the present invention is applicable to a single body and further to the case where more than two bodies are to be analyzed.

It will be understood that the above disclosure is representative of only one possible embodiment of the present invention and that the concept on which the invention is based is not specifically limited thereto.

What is claimed is:

1. A method of making a device simulator by storing an executable device simulating application program in a computer system, and executing the stored executable device simulating application program to impart device simulating functionality to the computer system by controlling the operation of the computer system with a central processing unit (CPU), thus changing a state of the CPU by analyzing data representing a body exhibiting physical structure having physical and/or electrical characteristics and having a boundary including edges and faces by determining an intersection of said boundary with each of Delaunay partitioned tetrahedra of said body, said method comprising the steps of:

(a) producing a plurality of first tetrahedra of said body by dividing said body into a plurality of triangular prisms and then dividing each triangular prism into a plurality of tetrahedra;

(b) finding any face of each first tetrahedron, which is a face segment of said body, and finding any edge of each first tetrahedron which is an edge segment of said body;

(c) producing a plurality of second tetrahedra of said body based on said first tetrahedra, each second tetrahedron of the second tetrahedra being Delaunay partitioned;

(d) cyclically implementing following steps (e) to (i) to investigate in sequence all of said second tetrahedra;

(e) finding a unique point of said body within said each second tetrahedron;

(f) finding, among said first tetrahedra, a third tetrahedron of said body which includes said unique point therewithin;

(g) determining if any edge of said third tetrahedron, which is an edge segment of said body, intersects any face of said each second tetrahedron;

(h) determining if any face of said third tetrahedron, which is a face segment of said body, intersects any edge of said each second tetrahedron;

(i) obtaining intersection information for said body if an outcome of a determination at one of steps (g) and (h) is affirmative;

(j) finding a plurality of groups of said first tetrahedra of said body neighboring to each other after step (b);

(k) implementing steps (e) to (i) with respect to each of said groups of said first tetrahedra of said body;

(l) determining the physical and/or electrical characteristics from the obtained intersection information; and (m) using the physical and/or electrical characteristics in device simulation.

2. A method as claimed in claim 1, wherein said unique point of said body is a bary-center for said body of said each second tetrahedron.

3. A method as claimed in claim 1, wherein one of the cyclic implementations of steps (e) to (i) terminates when said intersection information for said body is generated at step (i).

4. A method as claimed in claim 1, wherein one of the cyclic implementations of steps (e) to (i) terminates if said outcome at each of steps (g) and (h) is not affirmative and if said each second tetrahedron is totally within said third tetrahedron of said body.

5. A method as claimed in claim 1, wherein one of the cyclic implementation of steps (e) to (i) terminates if an outcome at each of steps (g) and (h) is not affirmative and if said each second tetrahedron of said body is not totally within said third tetrahedron of said body and if all of said first tetrahedra of said body included in a given group are investigated.

6. A method as claimed in claim 1, wherein in said steps (a) to (k) said body comprises an electrical device.

7. A method as claimed in claim 6 wherein said steps (a) to (k) said electrical device comprises a semiconductor device.

8. A method as claimed in claim 7 wherein in said steps (a) to (k) said semiconductor device comprises a metal oxide semiconductor field effect transistor.

9. A method as claimed in claim 1, wherein in said steps (a) to (k) said body comprises an engineering body.

10. A method as claimed in claim 9, wherein in said steps (a) to (k) said engineering body comprises a construction engineering body.

11. A method as claimed in claim 9, wherein in said steps (a) to (k) said engineering body comprises a civil engineering body.

12. A method as claimed in claim 1, wherein in said steps (a) to (k) said body comprises an item of furniture.

13. A method as claimed in claim 1, wherein in said steps (a) to (k) said body comprises a machine manufacture.

* * * * *